Figure 1:
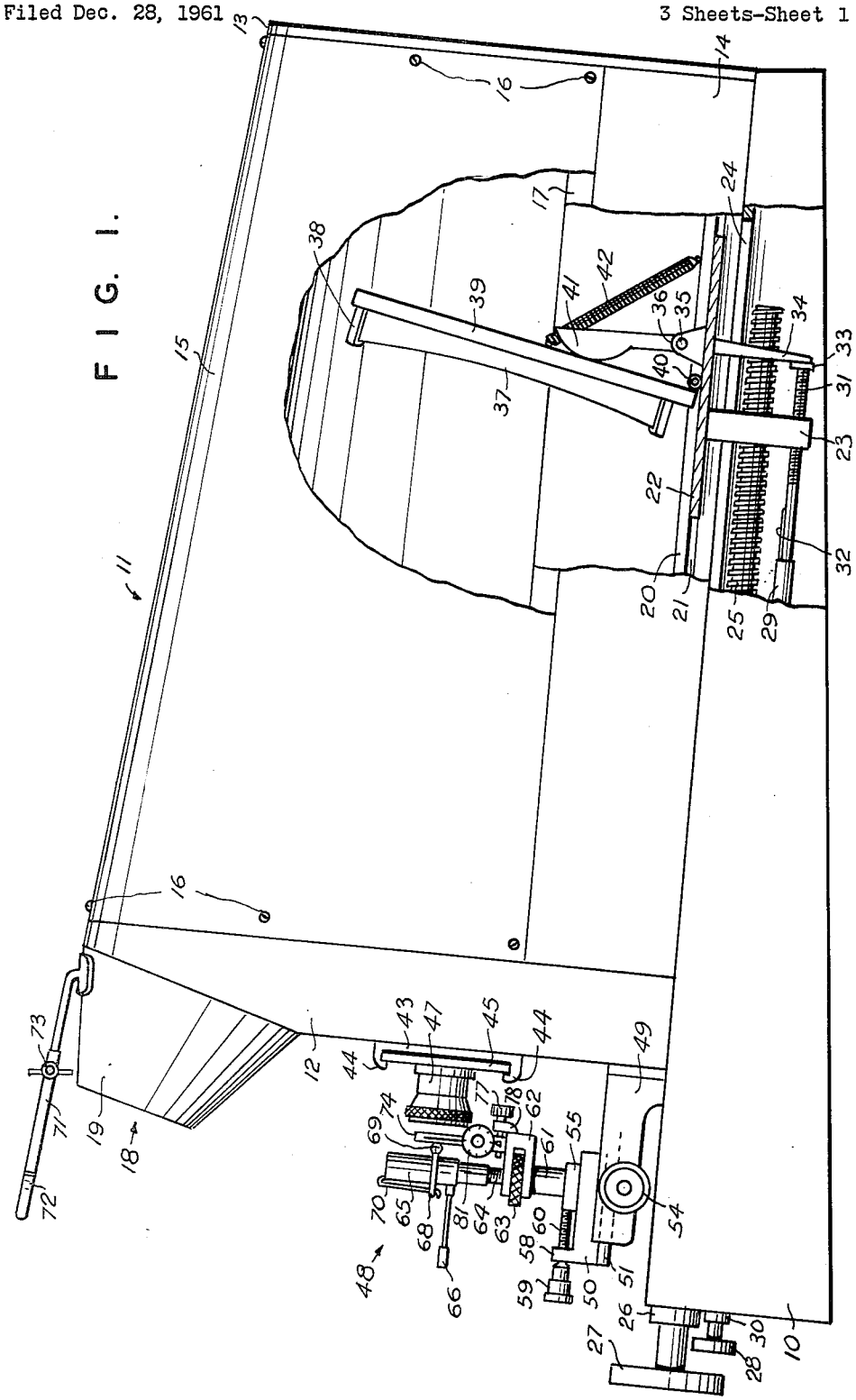

United States Patent Office 3,225,647
Patented Dec. 28, 1965

3,225,647
APPARATUS FOR VIEWING GEMS AND
SIMILAR OBJECTS
Douglas Albert Robinson, Lytton Melville Robinson, and James Dods, all of 186 Edward St., Brisbane, Queensland, Australia
Filed Dec. 28, 1961, Ser. No. 162,678
Claims priority, application Australia, Dec. 29, 1960, 67,928/60
6 Claims. (Cl. 88—24)

This invention relates to a new and improved apparatus for viewing enlarged images of translucent or transparent objects and particularly gems. The word "gems" in this specification will be understood to include stones whether cut or uncut and whether natural or artificial. For example, the term includes cut glass "stones," jewels as mined, natural crystals and cut jewels.

Gems which may appear to the naked eye to be of good quality may, in fact, have numerous imperfections which very greatly reduce their value. Diamonds, for example, may infrequently have inclusions of black carbon, and may be chipped, badly cut or otherwise flawed.

One of the main objects of this invention is to provide apparatus by means of which there may be made visible an image of a gem, whether set in a ring or not, the image of the gem being so magnified that any such blemishes in it will be made readily apparent even to an unskilled viewer. A further object of the invention is to provide such apparatus which includes means whereby a gem, mounted in a ring, for example, may be measured with reasonable accuracy so that its weight may be estimated quite closely without the necessity of removing the stone from its setting. Another object of the invention is to provide such apparatus which is usable without an eye-piece or screen, and which may be used by a person wearing spectacles to correct the user's vision. Still further objects of the invention are to provide such apparatus which is particularly simple to operate, which is economical to manufacture, and which is compact and readily portable.

With the foregoing and other objects in view, the invention relates broadly to apparatus for projecting an enlarged image of a gem including a holder to support said gem, a light source to illuminate said gem, and projecting means consisting of a lens and a concave mirror to project an enlarged image of a gem so illuminated. Preferably the support is a ring holder, which may be a member on which a ring may be slidably fitted and held firmly but releasably in place, the light source being preferably within the ring holder and adapted to emit light through an aperture therein. It is preferred that the gem support should be adjustable, rotatably, and vertically, and towards and away from the projecting means. It is preferred, too, that the lens be one of a number of interchangeable lenses, mounted at the front of a housing, and the concave mirror be within the housing, adapted to receive an illuminated enlarged image of a gem projected through the lens and to reflect it through a viewing window in the housing, so that the image may be received, illuminated and magnified, in the retina of the eye of a viewer, or on the film or plate of an appropriately positioned camera. Means for adjusting the lens, and for adjusting the mirror, are preferably provided. Other features of the invention will become apparent from the following description.

Figure 2:
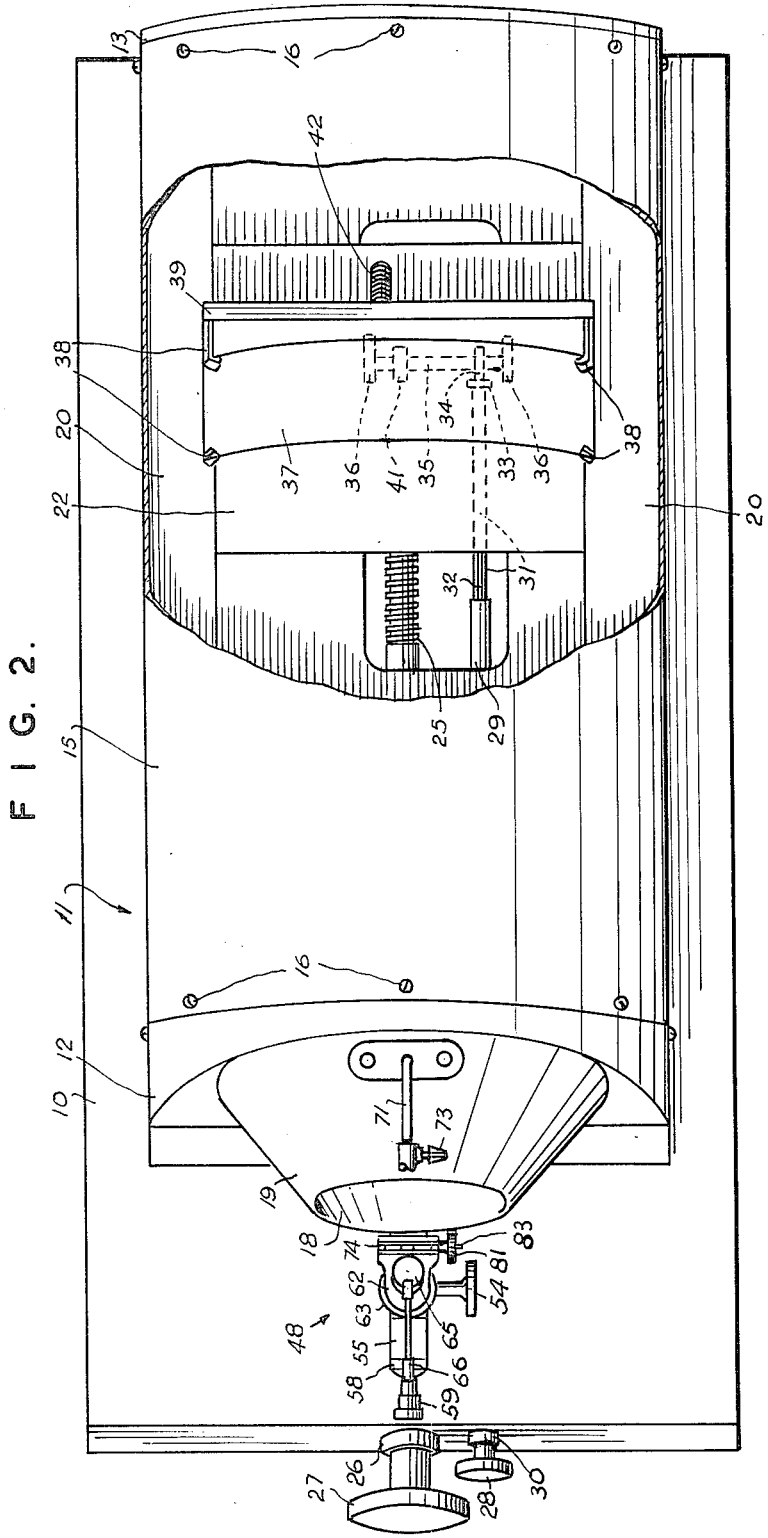
Figure 3:
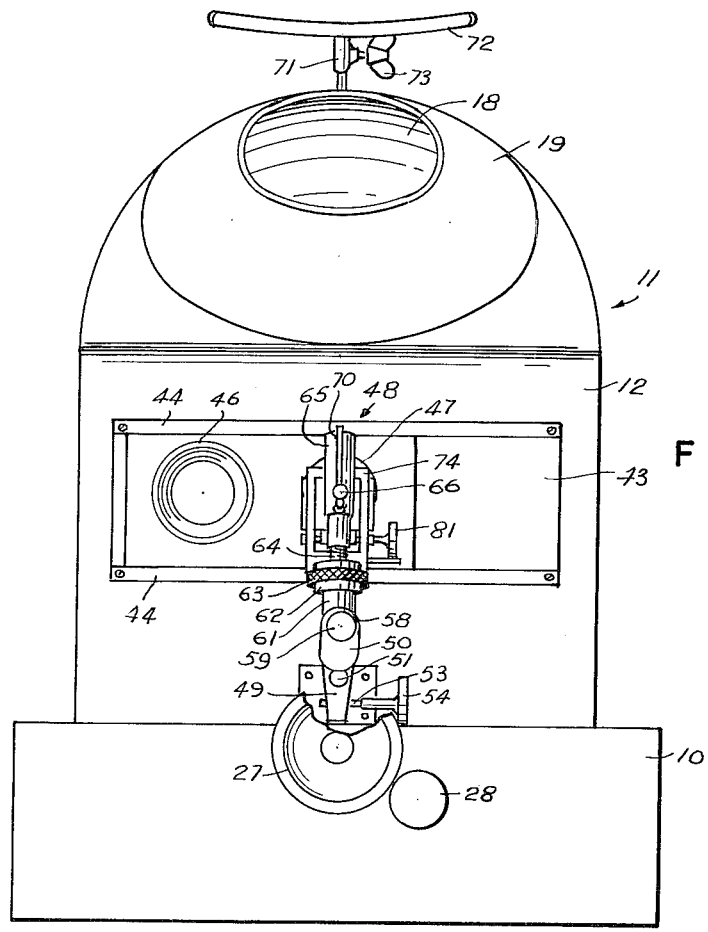
Figure 4:
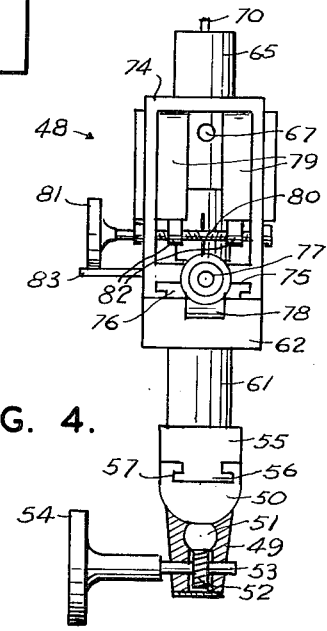

In order that the invention may be readily understood and carried into practical effect, a preferred embodiment will be described with reference to the accompanying drawings, wherein:

FIG. 1 is a partly broken-away side elevational view of apparatus according to the invention, FIG. 2 is a partly broken-away plan view of the apparatus, FIG. 3 is a front elevational view of the apparatus, and FIG. 4 is a rear view, to enlarged scale, of the ring holder assembly of the apparatus.

The apparatus shown in the drawings includes a base 10, which may be made of wood, and which is a hollow box-like structure, open at the bottom, its top inclining downwardly to the rear.

Mounted upon the base 10 is a housing 11, including a front 12, preferably a metal casting, a back 13, which may be of sheet metal, lower sides 14, also of sheet metal, and a sheet metal cover 15, held removably to the front 12 and back 13 by screws 16, the bottom edges of the cover being received in rebates 17 formed along the tops of the lower sides 14. A viewing window 18 into the housing is formed through a forwardly tapering projection 19 of elliptical cross-section formed integrally with the upper part of the housing front 12.

Longitudinal members 20 mounted within the lower sides of the housing 11 are formed with longitudinal guide grooves 21 which receive the side edges of a longitudinally slidable mirror carrier 22. This carrier consists of a rectangular metal plate, from which a block 23 extends downwardly, passing through a longitudinal slotted opening 24 in the top of the base housing 10.

A threaded hole formed through the block 23 is engaged by a mirror carrier adjusting screw 25, of which the unthreaded front portion passes through a bearing 26 at the front of the base, and is provided with an enlarged head 27, by means of which the screw may be rotated in one direction to cause the carrier to be moved forwards or rearwards, thus varying the distance between the mirror and a lens 47 to be later described.

A knob 28 in front of the base housing 10 is mounted on a hollow spindle 29 passing through a bearing 30 and receiving telescopically a tilt adjusting screw 31, a key 32 on this screw engaging in an appropriate keyway in the spindle so that the screw is longitudinally slidable in the spindle, but cannot be rotated in relation to the spindle. The tilt adjusting screw is engaged in a tapped aperture through the block 23, and at its rear end bears against a pad 33 at the lower end of a lever 34. This lever at its upper end is secured on a transverse shaft 35 rotatable in bearings in a pair of brackets 36 extending upwardly from the mirror carrier 22.

A concave mirror 37 is held by clips 38 on a backing board 39 the lower edge of which is hinged at 40 to the mirror carrier 22. A tilt adjusting arm 41 secured to and extending up from the shaft 35 bears against the backing board 39. A helical tension spring 42 connected between the backing board 39 and the rear part of the mirror carrier 22 maintains the mirror backing board in contact with the rounded upper front portion of the tilt adjusting arm. It will be seen, then, that by rotation of the carrier adjusting screw head 27 will cause the concave mirror 37 to be advanced or retracted without altering its tilt; and rotation of the knob 28 will adjust the tilt of the mirror.

Over a front opening 12 in the main housing is a lens carrier mounting 43, having top and bottom channelled guides 44 in which there is mounted in laterally slidable manner a lens mounting plate 45, on which there are mounted two adjustable lens assemblies 46 and 47, the lenses of the two assemblies being of different magnification. For clarity, only the one lens assembly 47 is shown in FIG. 1. By slidable movement of the plate 45, one lens or the other may be brought to central operative position in front of the opening through the front of the main housing.

In front of the main housing 11 there is mounted a ring holder assembly, indicated generally at 48. This assembly includes a main mounting bracket 49 secured to the lower central front part of the main housing and extending forwardly therefrom. A first carrier 50 is mounted in longitudinally slidable manner on the main mounting bracket, the arcuate-section lower part of this carrier engaging in a corresponding channel in the bracket, a longitudinal key 51 secured under this first carrier engaging in a corresponding key-way in the bracket. A small helical gear 52 is housed within the main mounting bracket 49, and mounted on a shaft 53 passing through this bracket and fitted at one side with a finger-wheel 54, engaged with appropriate teeth formed under the key 51, so that by rotation of the finger-wheel 54, the first carrier 50 may be moved forward or back.

A second carrier 55 is mounted in longitudinally slidable manner on the first carrier being provided with a downwardly extending key 56 engaging in a key-way 57 formed longitudinally from the top of the first carrier. On a lug 58 extending up from the front of the first carrier 50 there is mounted a micrometer head 59, the screw 60 of which is connected rotatably to the second carrier, so that by rotation of the micrometer head the second carrier may be advanced or retracted on the first carrier, its movement being measurable on the micrometer head.

Secured to and extending up from the second carrier 55 is a tubular standard 61 on which is secured a standard head 62, comprising two spaced parallel plates interconnected at the rear. A knurled height-adjusting nut 63 fitted closely between the plates of the standard head has a tapped axial hole engaged by a threaded stem 64 the lower part of which extends down into the tubular standard. A key (not shown) in the standard engages a key-way (not shown) formed in the threaded stem and restrains this stem against rotation, so that by rotating the nut 63 the threaded stem 64 may be raised or lowered.

On the un-threaded upper end portion of the stem 64 there is rotatably mounted the tubular lower end of a ring holder 65. The ring holder may be rotatably adjusted by means of a small handle 66 extending radially forwards from it.

Within the hollow upper part of the ring holder 64 there is fitted a light source comprising a small incandescent electric light bulb (not shown), which can emit light through a small round window 67 through the rear of the ring holder.

A ring, as indicated at 68 in FIG. 1, may be fitted down onto the ring holder 65 so that the stone 69 of the ring is located directly in front of the light window 67. To ensure that any ring may be located correctly, despite its diameter, there is mounted on the front of the top part of the ring holder the upper end of an expansion member comprising a thin leaf spring 70, which is formed with a U-bend and is carried down the front of the ring holder. This spring exerts pressure on the ring so as to hold the ring setting firmly in place in front of the light window, and in front of the lens 46 or 47, whichever is located in central operative position.

On the top of the projection 19 from the front 12 of the main housing 11 there is mounted the rear end of a telescopically adjustable carrier 71 for a forehead rest 72, a set screw 73 being provided whereby the forehead rest may be locked in desired adjusted position.

When the light bulb in the ring holder 65 is illuminated it projects light through the window 67 and, through the transparent gem stone 69 of the ring, so that an image of the stone may be projected through the lens 47 and reflected from the concave mirror 37 directly to the eye of an observer situated at an observer's viewing position at the focus of the mirror 37 near window 18, the observer's forehead being against the forehead rest 72. The image of the gem will be seen as an apparently three-dimensional image in the mirror 37, since there is no screen on to which the image is projected before reaching the eye. It may, of course, be necessary to carry out certain adjustments to ensure that a good and clear enlarged image of the stone is seen, by advancing or retracting the mirror 37 by means of the screw head 27 and/or altering its tilt by means of the knob 28, though such adjustments, once made, should rarely need to be corrected. In addition, the ring may be swung, by means of the handle 66, and raised or lowered by the nut 63 to bring its stone to central position in relation to the lens 47, and it may be advanced or retracted by means of the finger-wheel 54. The lens 47 may, of course, require to be adjusted also.

A particularly advantageous feature of the arrangement described stems from the illumination of the gem from that side opposite to the projecting means (lens 47 and mirror 37). The rear facets of the gem partly reflect and partly transmit the incident light, the reflected component being then internally reflected in the stone by other facets and emitted eventually to the projecting means. The result is a surprisingly clear image obtainable with a very low-power light source. Even though part of the back of a ring-stone may be obscured by its mounting, the whole stone appears to be equally bright in the image, and therefore a mounted stone can be thoroughly examined in situ.

It will be seen, then, that when any necessary adjustments are made, there is projected to the retina of the eye of a viewer an enlarged and brightly illuminated image of the stone of the ring. For a searching examination throughout the stone, the second carrier 55 may be moved by means of the micrometer head 59 so that, for example, the culet of the stone is first brought into focus, and then, by operation of the micrometer head the focus is brought progressively through the stone up to its table; and in this way, all of the carbon inclusions there may be in a diamond, for example, may be observed with very good definition; and with the focus at the table of the stone, any chipping or bad cutting may be very clearly observed.

If the micrometer head 59 is zeroed, and the first carrier 50 be moved so that the culet of the stone is focussed; and then the micrometer head is rotated to move the second carrier 55 until the table of the stone is focussed, then by taking the reading of the micrometer head the axial length of the stone may be determined. Alternatively, of course, instead of the micrometer head being zeroed initially, micrometer readings may be taken when the culet, and when the table, are focussed, and the one reading subtracted from the other.

From the axial length of a diamond, for example, and from its diameter, the weight of the stone may be calculated with a fair degree of accuracy. In order that the diameter of the stone may be determined fairly closely, there is mounted on the standard head 62 a rectangular upright shutter frame 74, a keyway 75 in the bottom of which is engaged by a longitudinal key 76 on the rear part of the standard head. A shutter frame adjusting screw 77 rotatably engaged in a lug 78 extending up from the rear of the standard head and threadedly engaged in the lower part of the shutter frame may be operated to advance or retract the shutter frame.

A pair of rectangular opaque shutters 79 are mounted in laterally slidable manner in upright slots in the sides of the shutter frame. A shutter adjusting screw 80 with a calibrated head 81 is rotatably mounted laterally in the lower part of the shutter frame, part of the screw having a left-hand thread, part having a right-hand thread. The two parts of the thread of the screw are engaged by two appropriately threaded nuts 82 secured to the shutters 79, so that by rotation of the calibrated head 81 in one direction or the other, the two shutters 79 may be brought together, or moved apart at similar rates. The separation between the two shutters at any time may be read on the calibrated head 81 against a fixed pointer or index 83 secured to and extending laterally from the shutter frame 74. When the image of a ring stone is being examined, then, the shutters 79 may be brought together by rotation of the calibrated head 81, which is thus zeroed, and by means of the shutter frame adjusting screw 77 the closed shutters may be brought as close as may be to the table of the ring stone. The shutters may then be moved apart until, to a viewer using the apparatus, the near edges of the shutters register with the outermost parts of the stone being viewed. If necessary, the ring holder 65 may be turned by means of the handle 66 to ensure that the inner edges of the shutters appear exactly at the sides of the stone. From the calibrated head, then, the diameter of the stone may be read. There may be some small inaccuracy due to parallax, but a calculation of the weight of the stone, based on the diameter reading and axial length reading obtained as before described will reasonably accurate and sufficient for most purposes.

Apparatus as described may be used in conjunction with a camera for obtaining photographs of gem stones, the camera being mounted in front of the window 18 on any suitable mounting, which may be hingedly connected to the main housing 11 so that the magnified image of a stone may be inspected by eye, in the way described, after which the camera is swung into position so that the magnified image may be recorded on a photographic film or plate.

The apparatus may be used also for viewing gems or the like which are not set in rings. An unset gem, for example, may be held by a small spring clamp or other holder arranged to support the gem in front of the light source.

The apparatus will be found to be very effective in achieving the objects for which it has been devised. As no eyepiece is required to view an enlarged illuminated image of a gem, a person may easily use the apparatus without removing vision-corrective spectacles; and if the user has myopia or presbyopia, uncorrected by spectacles, a gem may be viewed in correct focus by moving the head nearer towards or further from the viewing window, the forehead rest being correspondingly adjusted.

The preferred embodiment of the invention herein described and illustrated may be subject to many minor modifications of constructional detail and design which will be readily apparent to persons skilled in the art, and such modifications are considered to lie within the ambit of the invention as defined by the appended claims.

What we claim is:

1. Apparatus for projecting an enlarged image of a gem, comprising a light source to illuminate said gem, projecting means including a lens passing light from said gem to a concave mirror and thence directly to an observer's viewing position at the focus of said mirror, a first carrier movable towards and away from said lens, a second carrier mounted on said first carrier and movable relative thereto towards and away from said lens, a holder attached to said second carrier to support said gem and means to measure the relative movement between said first and second carriers.

2. Apparatus according to claim 1 including a pair of shutters transverse to the light path between said holder and said projecting means, means for varying the transverse separation between said shutters and means for measuring said separation.

3. Apparatus for projecting an image of a gem, including a hollow holder to support said gem, a light source within said holder to illuminate said gem, and projecting means consisting of a lens passing light from said gem to a concave mirror and thence directly to an observer's viewing position at the focus of said mirror.

4. Apparatus for projecting an image of a gem including a hollow ring holder to support a ring on which said gem is mounted, a light source within said ring holder, a window in said ring holder through which light from said source illuminates the inner faces of said gem, said light being projected through said gem to a lens and thence to a concave mirror, said mirror passing said light to an observer's viewing position at the focus of said mirror.

5. Apparatus according to claim 4 wherein said ring holder is substantially cylindrical, and is provided with an expansion member bearing outwardly on, and holding frictionally in place said ring fitted over said ring holder and the associated expansion member.

6. Apparatus for projecting an enlarged image of a gem, including a holder to support said gem, a light source to illuminate said gem and projecting means including a lens passing light from said gem to a concave mirror and thence directly to an observer's viewing position at the focus of said mirror, said holder being carried by a first carrier movable to vary the distance between said holder and said lens, a pair of shutters transverse to the light path between said holder and said projecting means, means for varying the transverse separation between said shutters and means for measuring said separation.

References Cited by the Examiner

UNITED STATES PATENTS

| | | | |
|---|---|---|---|
| 1,699,689 | 1/1929 | Curry | 88—28.90 |
| 2,051,946 | 8/1936 | Hewlett | 88—24 |
| 2,192,529 | 3/1940 | Thomas et al. | 88—24 |
| 2,375,260 | 5/1945 | Suydam | 88—14 |
| 2,380,567 | 7/1945 | Yawitz et al. | 88—14 |
| 2,489,462 | 11/1949 | Pierce | 88—14 |
| 2,533,747 | 12/1950 | Thienemann | 88—14 |
| 2,569,579 | 10/1951 | Rinker | 88—24 |
| 2,664,028 | 12/1953 | Meyer et al. | 95—56 |
| 2,742,813 | 4/1956 | Zeininger | 88—24 |

FOREIGN PATENTS

| | | |
|---|---|---|
| 231,047 | 10/1960 | Australia. |
| 1,163,263 | 4/1958 | France. |
| 767,838 | 2/1957 | Great Britain. |

LEO SMILOW, *Primary Examiner.*

EMIL G. ANDERSON, *Examiner.*